United States Patent [19]

Siede et al.

[11] Patent Number: 4,964,217

[45] Date of Patent: Oct. 23, 1990

[54] HANDLE FOR A CHAIN SAW

[75] Inventors: Reinhard Siede, Remshalden; Klaus Höppner, Marbach; Hermann Weiss, Steinheim; Wolfgang Weissert, Leutenbach, all of Fed. Rep. of Germany

[73] Assignee: Andreas Stihl, Waiblingen, Fed. Rep. of Germany

[21] Appl. No.: 335,181

[22] Filed: Apr. 7, 1989

[30] Foreign Application Priority Data

Apr. 8, 1988 [DE] Fed. Rep. of Germany ....... 3811788
Aug. 27, 1988 [DE] Fed. Rep. of Germany ... 8810851[U]

[51] Int. Cl.⁵ ............................................. B23D 57/02
[52] U.S. Cl. ......................................... 30/383; 30/381
[58] Field of Search .................................. 30/381–387

[56] References Cited

U.S. PATENT DOCUMENTS 4,324,045 4/1982 Höppner et al. ................. 30/383 X
4,817,291 4/1989 Stehle ..................................... 30/381

Primary Examiner—Douglas D. Watts
Attorney, Agent, or Firm—Walter Ottesen

[57] ABSTRACT

The invention is directed to the handle of a portable handheld tool such as a motor-driven chain saw. The handle is configured as a plastic body homogeneous with its bearing portions. The handle is for the most part hollow and can be configured as a unit to include further functional portions such as recesses for vibration attenuators, air guide portions and the like. The plastic handle is especially suited for portable handheld motor-driven chain saws.

13 Claims, 4 Drawing Sheets

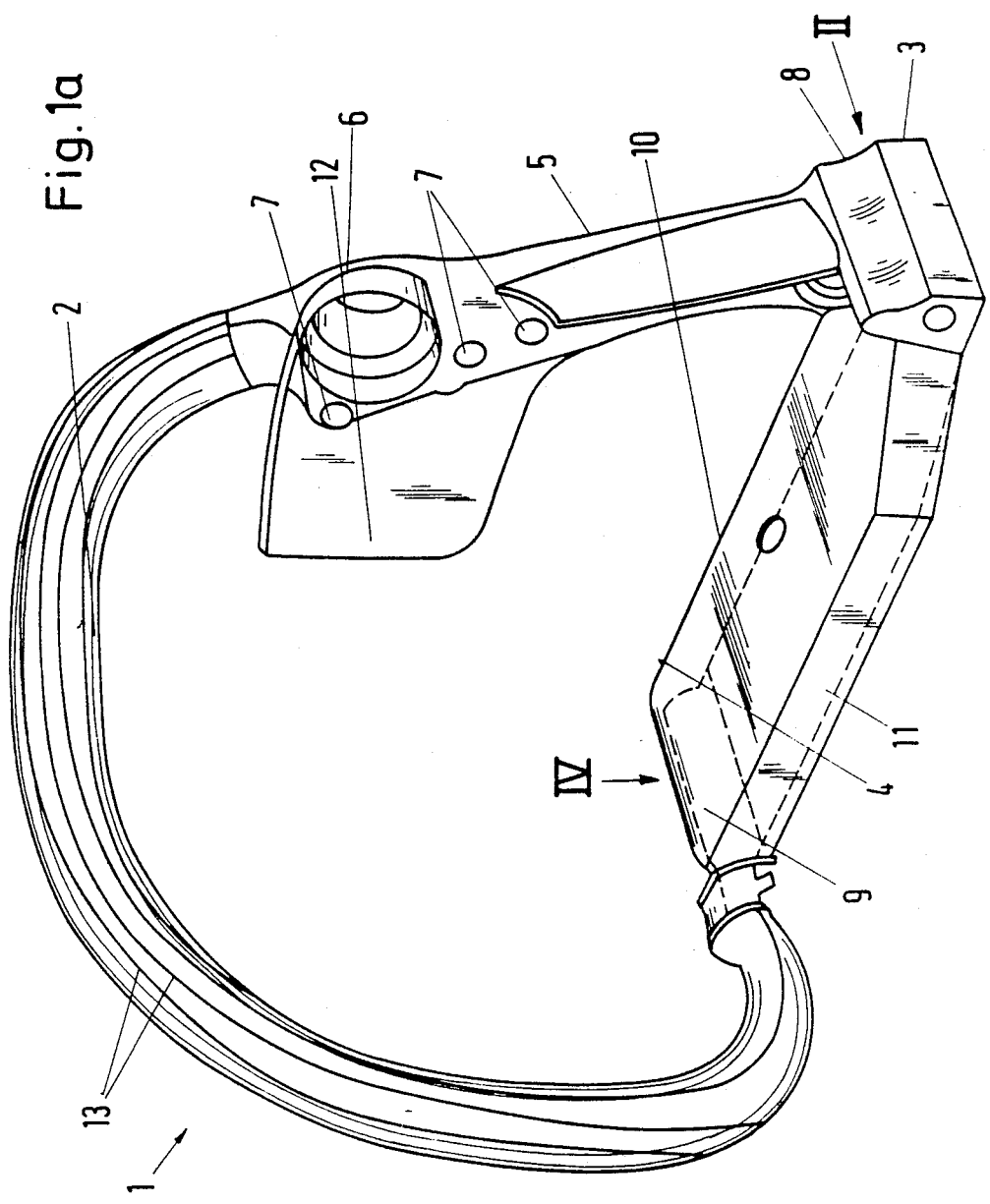

HANDLE FOR A CHAIN SAW

FIELD OF THE INVENTION

The invention relates to a bail-type handle for a portable handheld motor-driven chain saw. The handle is attachable to a motor housing of the chain saw by means of bearing portions and has a portion of tubular cross section.

BACKGROUND OF THE INVENTION

In motor-driven chain saws, it is known to use handles produced from an aluminum alloy in various configurations. In one such embodiment, attachment flanges are provided at both ends of the actual handle and these flanges have receiving openings for attachment bolts. The tube of which the handle is made is not closed and is instead configured so as to be open.

Another embodiment of a tubular handle is likewise configured so as to be open; however, in this embodiment, a connecting part is provided as a handle between the two end portions, namely, the actual attachment portions thereof. This additional part is a part separate from the actual tubular handle and is secured with threaded bolts to the tube which is the holding handle.

Furthermore, so-called closed handles are also known for which the actual handle parts however lie essentially in one plane since the processing of the aluminum tube outside of this plane is unsuitable for mass production because of the high cost. A further disadvantage is that additional components such as bearing parts or air guide sheet metal pieces must be attached to the tubular handle with threaded fasteners or must be separately attached in some other manner.

Since the handles of motor-driven chain saws are subjected to intense vibrations, special measures must be taken in order to make the additional individual parts especially secure against vibration on the handle tube and to ensure against an unwanted loosening. Furthermore, the separate production of additional components and their attachment makes production complex and is expensive, especially, since the handles are a mass-produced article.

SUMMARY OF THE INVENTION

It is an object of the invention to provide a bail-shaped handle for a motor-driven chain saw which can be produced with simple means and at favorable cost. It is a further object of the invention to provide a handle of this kind which has a compact stable configuration with handle components which are integrated to provide a satisfactory function and which lie in different planes.

According to a special feature of the handle of the invention, parts can be integrated already during the production of the plastic body defining the handle. Previously, these parts were produced as separate parts and had to be attached to the handle tube. Such separate parts include the following: the bearing parts for the attachment to the motor housing; the seats for receiving the vibration attenuating elements; handle tube formations for guiding cooling air for which cooling air guide sheet metal pieces had to be previously provided and separately mounted on the handle tube; stops for the holding hand of the person operating the chain saw in order to specifically define the handle region; the configuration of hollow spaces or volumes for receiving operating means such as gasoline, oil or the like such that supply spaces in portions of the handle are integrated in the manner of a gasoline tank or an oil tank. Furthermore, the mounting of end stops for the attenuating elements and an individual adaptation of the spacial form of the handle attachments on corresponding attachment locations of the motor housing must be made directly in one work operation.

Furthermore, the handle can be advantageously so configured that it defines a unit which closes on itself, that is, a homogeneously closed part which must not be bolted together or assembled from different individual parts. In this way, the stiffness of the handle in its entirety is substantially increased. At the same time, the dimensions of the handle with respect to the configuration of the cross section and wall thicknesses can be reduced compared to other materials and/or handle configurations. A connecting strut can be provided between the attachment locations of the handle.

A further advantage is that to improve the graspability, the plastic body handle can be directly provided with grooving or scoring by appropriately shaping the actual handle surface and this would be in lieu of providing a separate hose-like grooved jacket. The essentially hollow plastic body handle can then be a homogeneous whole part incorporating all accessory parts with the cross sections and wall thicknesses of the handle being adapted to the function of the individual handle portions. For example, wall portions can be dimensioned with respect to their thicknesses thinner than other wall portions of the handle in accordance with the function to be performed. However, entire portions can be at least partially configured so as to be massive such as the attachment portions in correspondence to the mechanical loading; whereas, the cutouts for enclosing the counter attachment parts disposed on the motor housing in a form-tight manner can be precisely adapted to these counter attachment parts and can be hollow to correspond thereto.

The plastic body handle of the invention can be advantageously produced by thermal plastic injection or foaming. The plastic can preferably be a polyamide and, for the case where production is by foaming, the plastic can be supplemented with a foaming agent such as aceobicarbonate. If the handle is produced pursuant to the gas-inner-pressure process (a process wherein gas under pressure is admitted into a mold containing a plastic melt), the form cavity can be filled approximately to half with the plastic melt. This can take place at a temperature of approximately 250° C. to 290° C. After interrupting the supply of plastic, a gas, preferably nitrogen, is blown into the liquid plastic at a predetermined specific viscosity with the gas pressure being approximately 60 to 200 bar. The gas drives the plastic core ahead into the form with the liquid plastic coming to rest on the inner walls of the form so that the plastic body handle is formed in correspondence to the inner contours of the form with a hollow space being formed inside the handle by the pressure of the gas. The plastic used can be polyamide 6 and can be modified with an elastomer to increase its resistance to impact and, in addition, the plastic can be enriched with a stabilizing filter, preferably short glass fibers. The filler proportion can amount to approximately 30%.

BRIEF DESCRIPTION OF THE DRAWINGS

The invention will now be described with reference to the drawings wherein:

FIG. 1a is other embodiment of the handle according to FIG. 1;

FIG. 2 is a side elevation view of the forward attachment portion of the handle of FIG. 1a viewed in the direction of arrow II of FIG. 1a;

FIG. 4 is a plan view of the rearward attachment portion of the handle of FIG. 1a viewed in the direction of arrow IV of FIG. 1a.

DESCRIPTION OF THE PREFERRED EMBODIMENTS OF THE INVENTION

Figure 1:
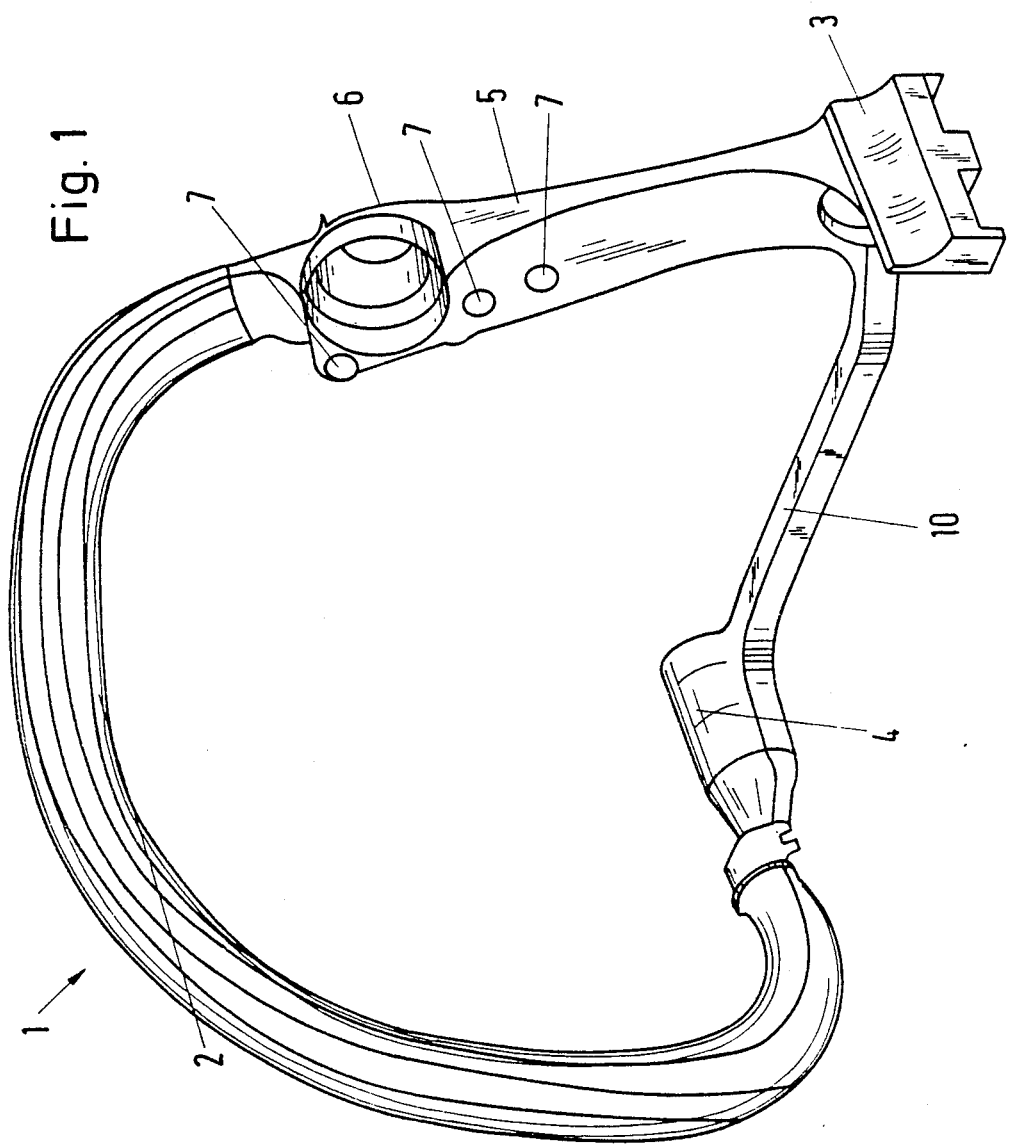
FIG. 1 is a perspective view of the plastic body handle according to the invention.
Figure 3:
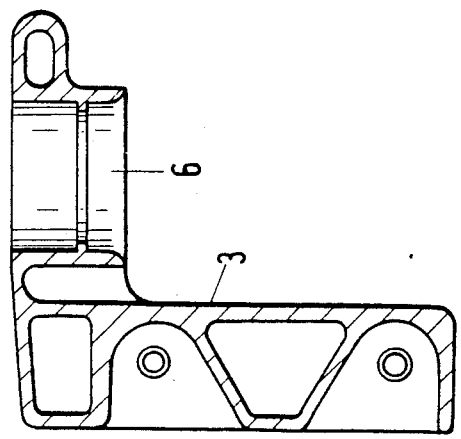
FIG. 3 is a section view taken along line III—III of the forward attachment portion of the handle of FIG. 2.
Figure 2:
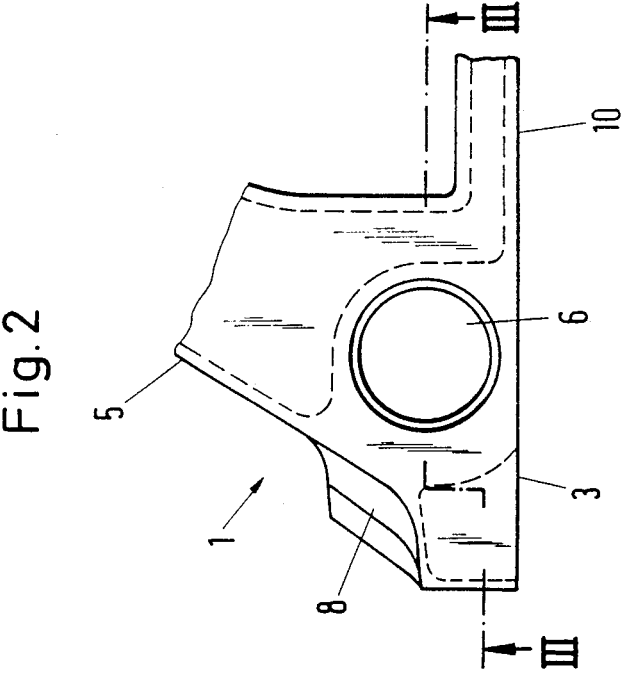
Figure 4:
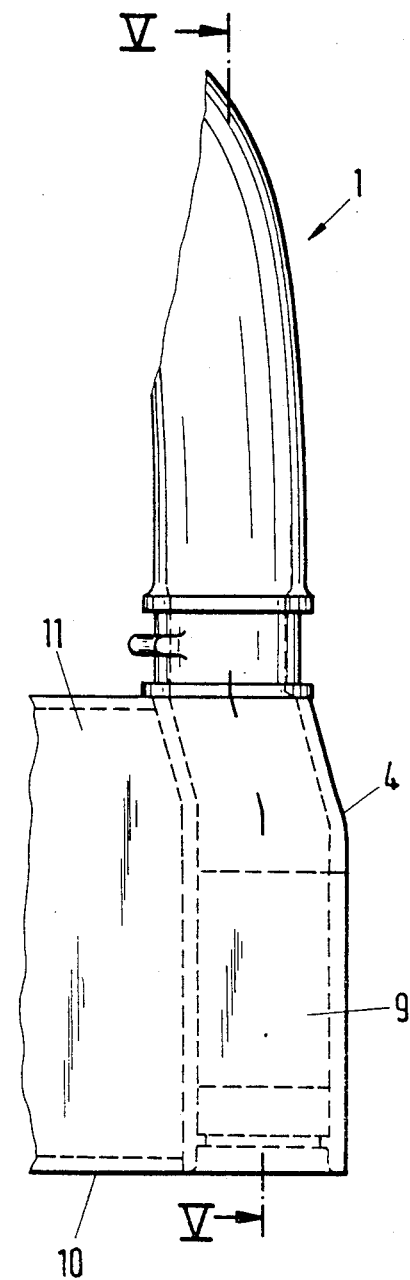
Figure 5:
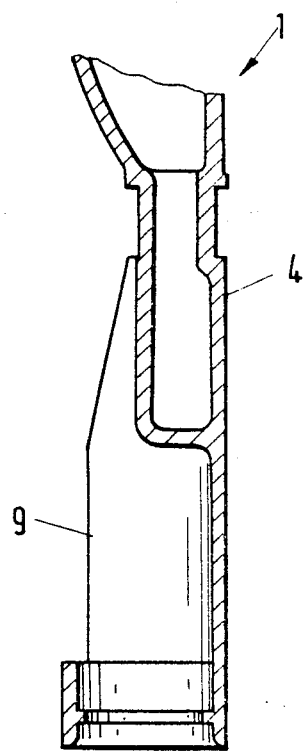
FIG. 5 is a section view taken along line V—V of the rearward attachment portion of FIG. 4.

The plastic body handle 1 shown in the drawing is for a portable handheld motor-driven chain saw and can be attached to the motor housing. The essentially round-like plastic body handle 1 is closed upon itself and is produced pursuant to the so-called gas-inner-pressure process. The handle is for the most part hollow inside.

The plastic body handle 1 has a three-dimensional form with the upper holding handle portion 2 being ergometrically displaced with respect to the lower forward bearing portion 3 and a likewise lower rearward bearing portion 4. The bearing portions (3, 4) are connecting portions by means of which the handle is attached to the motor-driven chain saw. The holding portion 2 thereby lies in another plane than the lower portions (3, 4) which are provided for attaching the handle 1 to the motor housing. The holding handle portion 2 has a cross section which is essentially of tubular or circular cross section. It can also be advantageous to configure the holding handle portion 2 so as to have an oval cross section.

The handle portion 5 is provided between the upper holding handle portion 2 and the forward bearing portion 3 and is inclined. The handle portion 5 has receiving means 6 formed therein at approximately mid-elevation and at the lower end for accommodating respective attenuating elements. These receiving means 6 are made of the same material as the remainder of the handle and are unitary therewith and can be configured as a bearing eye or the like. Next to the bearing eye 6, abutment recesses 7 can be formed which are similar to a blind bore wherein corresponding abutments of the motor housing can engage. At the forward bearing portion 3 and/or rearward bearing portion 4, further recesses (8, 9) can be provided for the vibration attenuating elements. These recesses (8, 9) can be configured as hollow bearing seats or as bearing eyes.

Between the forward bearing portion 3 and the rearward bearing portion 4, a connecting strut 10 can be provided and be formed onto the handle and made of the same material so that the plastic body handle 1 is a closed entity. The connecting strut 10 and the approximately vertical handle portion 5 can be configured so as to have cross sections which are different than the tubular holding handle portion 2 and can, for example, be configured so as to be rectangular. Also, different wall thicknesses can be provided in correspondence to the different functional requirements so that thin-walled handle regions as well as thick-walled stable handle regions are provided.

In a preferred embodiment, the connecting strut 10 can be so configured that a tank chamber 11 is defined.

That is, the tank chamber 11 is integrated into the connecting strut 10 in a space-saving manner. The tank chamber 11 can serve to receive liquid operating means such as gasoline or oil. The tank chamber 11 can also contain a lubricant which can be metered to the saw chain guided for movement around the guide bar during operation of the motor-driven chain saw.

In a further embodiment of the plastic body handle 1, even motor covering parts and especially air guiding parts 12 can be provided which are positioned directly toward the motor. In the present embodiment, the air guiding part 12 is formed on the handle portion 5. By forming the air guide portion 12 on the handle so that it is of the same material and unitary therewith, the advantage is provided that a portion of the mass of the vibrating tool is taken away and assigned to the plastic body handle 1 journalled so as to be damped against vibration so that a reduction against oscillations is provided.

Furthermore, it should be noted that the holding handle portion 2 of the plastic body handle 1 can be provided with scoring or grooving 13 through appropriate forming of the surface with the plastic body handle 1 being preferably produced pursuant to the inner-pressure process described above. In this way, an improvement in grasping is achieved without the need to provide a separate hose-like jacket. It is also possible to provide the holding handle portion 2 with a protective covering made of elastic material such as rubber, thermoplastic material or the like.

The plastic handle 1 according to the invention can be produced according to the gas-inner-pressure process with all functional parts 2 to 13 described above and can be produced as a total part which is homogeneous so that a compact component is provided which can be produced as a mass-produced article having uniformly high quality and which has the lowest possible weight as well as a durable stability. Furthermore, the plastic body handle 1 of the invention has a low heat conductivity so that a handling free of difficulty is assured in summer as well as in winter at low temperatures.

It is also possible to produce the new handle with a connecting strut 10 and bearing portions (3, 4) by means of a plastic foaming process.

It is understood that the foregoing description is that of the preferred embodiments of the invention and that various changes and modifications may be made thereto without departing from the spirit and scope of the invention as defined in the appended claims.

What is claimed is:

1. In a portable, handheld tool such as a motor-driven chain saw having a motor housing, a bail-shaped handle attached to the motor housing for supporting and manipulating the tool, the bail-shaped handle comprising:

a tubular holding portion having a tubular cross section and having respective ends and being adapted to be manually held by an operator of the tool;

first and second bearing portions for attaching said handle to said motor housing, said first and second bearing portions being connected to corresponding ones of said ends and being homogeneous with said holding portion;

connecting means extending directly between said bearing portions and being integral therewith for completing the bail-shaped handle;

said holding portion, said first bearing portion, said second bearing portion and said connecting means being interconnected in a continuous integral unit closed upon itself thereby imparting stability to the handle;

said integral unit being a plastic body which is hollow at least in the region of said holding portion; and, said integral unit having cross sections departing from said tubular cross sections and having different wall thicknesses at said cross sections.

2. The bail-shaped handle of claim 1, said connecting means being a rigid structural force-transmitting segment connected between said first bearing portion and said second bearing portion.

3. The bail-shaped handle of claim 2, said integral unit including an additional portion extending between one of said bearing portions and said holding portion; and, attenuator receiving means formed in said additional portion.

4. The bail-shaped handle of claim 2, said for-transmitting segment including a hollow tank chamber formed therein.

5. The bail-shaped handle of claim 4, said force-transmitting segment being a connecting strut; and, said hollow tank chamber being formed in said connecting strut.

6. The bail-shaped handle of claim 2, said force-transmitting segment including an air guiding portion formed thereon so as to be homogeneous therewith.

7. The bail-shaped handle of claim 6, said air guiding portion being formed on said additional portion.

8. The bail-shaped handle of claim 1, said first bearing portion being a forward bearing portion arranged forward of said second bearing portion; and, receiving means formed in at least one of said bearing portions for accommodating an attenuator element therein.

9. The bail-shaped handle of claim 1, said integral unit being formed in a mold and having an outer surface; and, groove means homogeneously formed in said surface when said integral unit is formed.

10. The bail-shaped handle of claim 1, said first bearing portion being a forward bearing portion disposed beneath said holding portion and forward of said second bearing portion with said second bearing portion being a rearward bearing portion; said holding portion being an upper holding portion and extending approximately in a vertically inclined plane with respect to said forward bearing portion; said integral unit including an additional portion extending between said upper holding portion and said forward bearing portion; said additional portion including an upper segment and a lower segment; first recess means formed in said upper segment for accommodating a first attenuating element therein and second recess means formed in said lower segment for accommodating a second attenuating element therein; and, said rearward bearing portion likewise being disposed beneath said holding portion so as to be at approximately in the same elevation as said forward bearing portion.

11. The bail-shaped handle of claim 1, comprising a protective jacket made of an elastic material enclosing said holding portion.

12. The bail-shaped handle of claim 11, said protective jacket being made of an elastic substance selected from the group consisting of: rubber and thermoplast.

13. The bail-shaped handle of claim 2, said integral unit being a unitary member formed by means of a plastic foaming process.

* * * * *

UNITED STATES PATENT AND TRADEMARK OFFICE
CERTIFICATE OF CORRECTION

PATENT NO. : 4,964,217

DATED : October 23, 1990

INVENTOR(S) : Reinhard Siede, Klaus Höppner, Hermann Weiss and Wolfgang Weissert It is certified that error appears in the above-identified patent and that said Letters Patent is hereby corrected as shown below:

In column 3, line 3: delete "other" and substitute -- another -- therefor.

In column 3, line 12: insert -- , -- after "and".

Signed and Sealed this

Twenty-eighth Day of January, 1992

Attest:

HARRY F. MANBECK, JR.

Attesting Officer — Commissioner of Patents and Trademarks